United States Patent
Al-Dajane et al.

(10) Patent No.: US 12,440,830 B2
(45) Date of Patent: *Oct. 14, 2025

(54) LIGANDS FOR PRODUCTION OF 1-OCTENE IN CHROMIUM ASSISTED ETHYLENE OLIGOMERIZATION PROCESS

(71) Applicant: SABIC Global Technologies B.V., Bergen op Zoom (NL)

(72) Inventors: Maher Al-Dajane, Thuwal (SA); Abdulaziz Al-Nezari, Thuwal (SA); Ilia Korobkov, Thuwal (SA); Khalid Albahily, Thuwal (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 1020 days.

This patent is subject to a terminal disclaimer.

(21) Appl. No.: 17/435,831

(22) PCT Filed: Mar. 16, 2020

(86) PCT No.: PCT/IB2020/052400
§ 371 (c)(1),
(2) Date: Sep. 2, 2021

(87) PCT Pub. No.: WO2020/188476
PCT Pub. Date: Sep. 24, 2020

(65) Prior Publication Data
US 2022/0152602 A1    May 19, 2022

Related U.S. Application Data

(60) Provisional application No. 62/820,437, filed on Mar. 19, 2019.

(51) Int. Cl.
*B01J 31/18* (2006.01)
*C07F 9/50* (2006.01)

(52) U.S. Cl.
CPC .......... *B01J 31/189* (2013.01); *C07F 9/5027* (2013.01); *B01J 2231/20* (2013.01); *B01J 2531/62* (2013.01)

(58) Field of Classification Search
None
See application file for complete search history.

(56) References Cited

U.S. PATENT DOCUMENTS

| 7,361,623 B2 | 4/2008 | Dixon et al. |
| 7,381,857 B2 | 6/2008 | De Boer et al. |

(Continued)

FOREIGN PATENT DOCUMENTS

| EP | 3171974 | 4/2018 |
| JP | 2008 537905 A | 10/2008 |

(Continued)

OTHER PUBLICATIONS

International Search Report and Written Opinion for Application No. PCT/US2020/052400, mailed Jun. 3, 2020, 14 pages.

(Continued)

*Primary Examiner* — Amy C Bonaparte
(74) *Attorney, Agent, or Firm* — Womble Bond Dickinson (US) LLP (57) ABSTRACT

Processes to produce tunable mixtures of 1-hexene and 1-octene are described. The process includes contacting a mixture of a 1-hexene catalyst and a 1-octene catalyst with (Continued)

ethylene under conditions sufficient to produce a composition that includes a desired amount 1-hexene and 1-octene are described.

22 Claims, 2 Drawing Sheets

(56) References Cited

U.S. PATENT DOCUMENTS

| | | | |
|---|---|---|---|
| 7,867,938 | B2 | 1/2011 | De Boer et al. |
| 10,407,359 | B2 | 9/2019 | Alqahtani et al. |
| 10,421,064 | B2 * | 9/2019 | Al-Hazmi ............... B01J 31/187 |
| 11,247,201 | B2 * | 2/2022 | Al-Nezari ............ B01J 31/0265 |
| 11,511,265 | B2 * | 11/2022 | Al-Nezari ............... B01J 31/143 |
| 11,925,927 | B2 * | 3/2024 | Al-Nezari ............... B01J 31/189 |
| 2017/0203288 | A1 | 7/2017 | Al-Hazmi et al. |
| 2022/0001368 | A1 * | 1/2022 | Al-Nezari ................. C07C 2/34 |

FOREIGN PATENT DOCUMENTS

| | | |
|---|---|---|
| JP | 2009 516580 A | 4/2009 |
| WO | WO 2009/068157 | 6/2009 |
| WO | WO 2016/012948 | 1/2016 |
| WO | WO 2020/100007 | 5/2020 |
| WO | WO 2020/100010 | 5/2020 |

OTHER PUBLICATIONS

Jefferson et al. (J. Chem. Soc. Dalton Trans. 1973, 1414-1419).
Peulecke N. et al: "Ligands with an NPNPN-framework and their application in chromium catalysed ethane tri-/tetramerization", Dalton Transactions, vol. 45, No. 21, Jan. 1, 2016 (Jan. 1, 2016), pp. 8869-8874, XP55659808 ISSN: 1477- 9226, DOI: 10.1039/C6DT01109H.
JP Office Action dated Nov. 16, 2023 of related JP Patent Application No. 2021-556644 with filing date of 17 Sep. 2021; 18 pages.
First Office Action and Search Report issued by the China National Intellectual Property Administration, dated Apr. 22, 2023.
Liu, et al., "Development in the Research of Chromium Catalysts Bearing PNP Ligands in Selective Ethylene Oligomerization", (Abstract), Energy Chemical Industry, Aug. 2016, pp. 1-10, vol. 37, No. 4.
Xiaobo, et al., "Progress on Research of Catalyst for the Preparation of Ethylene Tetramerization" (Abstract), Chemical Production and Technology, 2008, pp. 38-42, vol. 15.
Buwei, et al, "Progress on Research of Catalysts for Ethylene Oligomerization to α Olefins", Advances in Fine Petrochemicals (Abstract), 2007, pp. 51-58, vol. 6.
Zhang, et al., "Synthesis of Diphenylphosphinoamine Ligands and their Catalytic Performance for Ethylene Tetramerization with CR(III) Compounds" (Abstract), Chinese Journal of Catalysis, May 2006, vol. 27, No. 5.

* cited by examiner

LIGANDS FOR PRODUCTION OF 1-OCTENE IN CHROMIUM ASSISTED ETHYLENE OLIGOMERIZATION PROCESS

CROSS REFERENCE TO RELATED APPLICATIONS

This application is a national phase application under 35 U.S.C. § 371 of International Application No. PCT/IB2020/052400, filed Mar. 16, 2020, which claims the benefit of priority to U.S. Provisional Patent Application No. 62/820,437, filed Mar. 19, 2019, the entire contents of each of which are hereby incorporated by reference in their entirety.

BACKGROUND OF THE INVENTION

A. Field of the Invention

The invention generally concerns a process to produce a composition that include 1-hexene and 1-octene from ethylene. The process includes contacting ethylene with a 1-octene catalyst and a 1-hexene catalyst under conditions sufficient to oligomerize the ethylene and produce the composition that includes 1-hexene and 1-octene.

B. Description of Related Art

Existing processes for the production of linear alpha olefins (LAOs), including comonomer-grade 1-butene, 1-hexene, and 1-octene, rely on the oligomerization of ethylene, and can lead to a mixture of ethylene-derived oligomers having a chain length of 4, 6, 8, and so on. Without being bound by theory, it is believed that this is due to a chemical mechanism mainly governed by competing chain growth and displacement reaction steps, leading to a Schulz-Flory- or Poisson-product distribution. From a commercial standpoint this product distribution poses a challenge for the full-range LAO producer as each served market segment can exhibit a different behavior in terms of market size and growth, geography, fragmentation etc. It is, therefore, difficult for the LAO producer to adapt to the market requirements due to part of the product spectrum might be in high demand in a given economic context, while at the same time, other product fractions might not be marketable at all or only in a marginal niche. For example, certain grades of polyethylene materials call for improved physical properties such as superior tensile strength and crack resistance, requiring the presence of 1-octene, but not other ethylene-derived oligomers.

Oligomerization of ethylene usually proceeds in the presence of suitable catalysts. Several of the existing ethylene oligomerization, i.e., dimerization, trimerization or tetramerization, catalysts have one or more disadvantages. These disadvantage can include: 1) low selectivity for the desirable products, (e.g., 1-octene and/or 1-hexene); 2) low selectivities for the LAO isomer within the $C_8$ cut (e.g., isomerization, branched olefin formation etc.); 3) wax formation (e.g., formation of heavy, long-chain (high carbon-number) products); 4) polymer formation (polyethylene, including branched and/or cross-linked PE) that can lead to considerable LAO product yield loss as well as fouling of equipment; 5) poor turnover rates/catalyst activity, resulting in increased cost per kg product; 6) high catalyst or ligand cost; 7) complex, multi-step ligand synthesis, resulting in poor catalyst availability and high catalyst cost; 8) susceptibility of catalyst performance, both in terms of both activity and selectivity, to trace impurities (leading to, for example, catalyst losses/poisoning); 9) difficult handling of catalyst components in a technical/commercial environment (e.g., during catalyst complex synthesis, pre-mixing, inertization, catalyst recovery, or ligand recovery); 10) harsh reaction conditions, for example high temperatures and pressure, resulting in a need for special equipment (increased investment-, maintenance-, and energy costs); 11) high co-catalyst/activator cost or consumption; and/or 12) susceptibility to varying co-catalyst qualities, which is often the case when larger amounts of relatively ill-defined compounds are used as activators (e.g., certain methylaluminoxane (MAO)-varieties).

Attempts to produce LAOs have been described. By way of example, U.S. Patent Application Publication No. 2017/0203288 to Al-Hazmi et al. describes the use of a catalyst composition that can include a chromium compound and an functionalized triamino, diphosphine (NPNPN) ligand of the formula $(R^1)$ $(R^2)N-P(R^3)-N(R^4)-P(R^5)-N(R^6)(R^7)$, wherein $R^1$, $R^2$, $R^3$, $R^4$, $R^5$, $R^6$, and $R^7$ are each independently hydrogen, halogen, amino, tri-methylsilyl or $C_1$-$C_{20}$ hydrocarbyl, preferably straight-chain or branched $C_1$-$C_{10}$ alkyl, phenyl, $C_6$-$C_{20}$ aryl or $C_6$-$C_{20}$ alkyl-substituted phenyl. This catalyst suffers in that it produces about a greater than 8 wt. % $C_{10+}$, and about a 50:50 wt. % ratio of 1-hexene to 1-octene. When the ratio increases to favor $C_6$ to $C_8$, the amount of $C_{10+}$ also increases, thus lowering the overall amount of desired product. In yet another example, Peulecke (*Dalton Transactions*, 2016, 45; 8869-8874) describes the production of mixtures of 1-hexene and 1-octene using a NPNPN ligand of the formula $(R^1(R^2)N-P(Ph)-N(R^3)-P(PH)-N(R^4)(R^5)$. This catalyst system suffers in that greater than 11 wt. % $C_{10+}$ is produced and the production of $C_{10+}$ hydrocarbons increases as the yield of 1-octene increases over the yield of 1-hexene.

There accordingly remains a need for catalyst systems for the oligomerization of ethylene that can yield mixtures of 1-octene and 1-hexene with high selectivity and purity.

SUMMARY OF THE INVENTION

A discovery has been made that provides a solution to at least some of the problems associated with the fluctuation in demand for 1-octene and/or 1-hexene. The solution is premised on using a mixture of a 1-hexene catalyst and a 1-octene catalyst to oligomerize ethylene to produce a composition that includes a mixture of 1-hexene and 1-octene in desired amounts. Production of 1-hexene and 1-octene at the same time provides the following advantages of: 1) variation of the composition of the oligomer mixture (e.g., a weight ratio of 1-hexene to 1-octene ratio from 20:80 to 90:10) depending on the amount of each individual catalyst in the tandem mixture, which will allow continuous production of a variable tandem mixture based on economic and/or processing needs. Thus, real time variations in the final products yield can be obtained without stoppage of production to change catalysts and/or the feed source. Furthermore and as exemplified in a non-limiting manner in the Examples, the catalyst are stable in the presence of each other, the catalytic activity of the tandem catalysts system is high, and purity of the high quality oligomers can be achieved.

The 1-octene catalyst can include a $NPN(CH_3)PN$ ligand system having specific terminal amine alkyl substituents and phosphorous. Notably, the phosphorous substituents are limited to aromatic groups and/or alkyl substituted aromatic groups, and the terminal amines include linear alkyl groups that are different by 3 carbon atoms. As illustrated in a non-limiting way in the Examples, it was surprisingly found that limiting the substituents of the phosphorous atoms to an aromatic group or substituted aromatic group and the length of the hydrocarbon chain on the terminal nitrogen atoms produces at least 60 wt. % C8 hydrocarbons at a selectivity of 1-octene greater than 99%, and less than 2 wt. % solvent insoluble material (e.g., polymeric).

The 1-hexene catalyst can be NPN(CH$_3$)PN ligand system having specific terminal amine alkyl substituents and phosphorous. Notably, the phosphorous substituents are limited to substituents that may be the same or different and selected from the group consisting of (i) C$_3$ to C$_4$ non-cyclic aliphatic groups, (ii) C$_5$ to C$_7$ aliphatic groups which may be cyclic or non-cyclic, linear or branched, substituted or unsubstituted, and (iii) any combination thereof; and preferably to cyclohexyl groups, and the terminal amines include linear alkyl groups that differ in length by 3 carbon atoms. As illustrated in a non-limiting way in the Examples, it was surprisingly found that limiting the substituents of the phosphorous atoms to substituents that may be the same or different and are selected from the group consisting of (i) C$_3$ to C$_4$ non-cyclic aliphatic groups, (ii) C$_5$ to C$_7$ aliphatic groups which may be cyclic or non-cyclic, linear or branched, substituted or unsubstituted, and (iii) any combination thereof; and preferably to cyclohexyl groups, and the length of the hydrocarbon chain on the terminal nitrogen atoms produces at least 80 wt. % 1-C$_6$ hydrocarbon at a selectivity of greater than 99%, 1-hexene and less than 3 wt. % solvent insoluble material (e.g., C$_{10+}$) material.

In one aspect of the present invention, catalyst compositions for the production of 1-hexene and 1-octene are described. A catalyst composition can include a 1-hexene catalyst and a 1-octene catalyst and the 1-hexene catalyst, the 1-octene catalyst, or both include a nitrogen, phosphorous, nitrogen, phosphorous, nitrogen (NPNPN) ligand. The catalyst composition can also include a chromium (III) species and an activator or co-catalyst (e.g., methylaluminoxane compounds, preferably, methyl iso-butyl aluminum oxide compound). Chromium (III) species can include any inorganic or organic chromium compound where chromium has a valance of +3. Non-limiting examples of chromium (III) species include chromium (III) acetylacetonate, Cr(2,2,6,6,-tetramethyl-3,5-heptadionate)$_3$, chromium(III)2-ethylhexanoate, chromium trichloride tris-tetrahydrofuran, chromium (III) octanoate, or chromium (III) naphthenate, or any combination thereof.

The 1-hexene catalyst can include chromium (III) complexed to a ligand having the structure of:

where R$^1$ and R$^2$ are the same or different and can be selected (i) C$_3$ to C$_4$ non-cyclic aliphatic groups, (ii) C$_5$ to C$_{10}$ aliphatic groups which may be cyclic or non-cyclic, linear or branched, substituted or unsubstituted, or (iii) any combination thereof; and, wherein n is 0 or 1, and m=n+3. In some embodiments, R$^1$ and R$^2$ can each independently be a cyclohexyl group or an alkyl substituted cyclohexyl group, preferably both are cyclohexyl groups. In one instance, n is 0 and the catalyst is (CH$_3$)(n-C$_4$H$_9$)NP(C$_6$H$_{11}$)N(CH$_3$)NP(C$_6$H$_{11}$)N(CH$_3$)(n-C$_4$H$_9$) represented by the following structure:

In another instance, n is 1 and the catalyst is (CH$_3$CH$_2$)(n-C$_5$H$_{11}$)NP(C$_6$H$_{11}$)N(CH$_3$)NP(C$_6$H$_{11}$)N(CH$_2$CH$_3$)(n-C$_5$H$_{11}$) represented by the following structure:

The catalyst composition can also include an activator or co-catalyst (e.g., methylaluminoxane compounds, preferably, methyl iso-butyl aluminum oxide compound). Chromium (III) species can include any inorganic or organic chromium compound where chromium has a valance of +3. Non-limiting examples of chromium (III) species include chromium (III) acetylacetonate, Cr(2,2,6,6,-tetramethyl-3,5-heptadionate)$_3$, chromium(III)2-ethylhexanoate, chromium trichloride tris-tetrahydrofuran; chromium (III) octanoate; chromium (III) naphthenate, or any combination thereof.

The 1-octene catalyst can include the chromium (III) species complexed to a ligand having the formula of:

where Ar$^1$ and Ar$^2$ can each be independently an aromatic group or a substituted aromatic group, n is 0 or 1 and m=n+3. In some embodiments, Ar$^1$ and Ar$^2$ can each be independently a phenyl group or an alkyl substituted phenyl group, preferably both are phenyl groups. In one instance, n is 0 and the catalyst is (CH$_3$)(n-C$_4$H$_9$)NP(C$_6$H$_5$)N(CH$_3$)NP(C$_6$H$_5$)N(CH$_3$)(n-C$_4$H$_9$) represented by the following structure:

In another instance, n is 1 and the catalyst is $(CH_3CH_2)(n\text{-}C_5H_{11})NP(C_6H_5)N(CH_3)NP(C_6H_5)N(CH_2CH_3)(n\text{-}C_5H_{11})$ represented by the following structure:

In yet another aspect of the present invention, processes to produce a composition that includes a mixture of 1-hexene and 1-octene are described. A process can include contacting a reactant stream that includes ethylene with a solution containing the catalyst composition of the present invention under conditions sufficient to oligomerize the ethylene and produce an oligomer composition that include a mixture of the 1-hexene and 1-octene. The solution can include a solvent, preferably, a saturated hydrocarbon, more preferably, n-hexane, methylcyclohexane, or a mixture thereof. Contacting conditions can include temperature and/or pressure. In some embodiments, a contacting temperature can be 15° C. to 100° C., preferably 40° C. to 70° C., a contacting pressure can be at least 2 MPa or 2 to 20 MPa, preferably 2 to 7 MPa, or both. Notably, the oligomer composition includes 10 wt. % or less of solvent insoluble material. A weight ratio of 1-hexene catalyst to 1-octene catalyst can be from 10:1 to 1:10, preferably 2:1 to 1:10, more preferably 1:1 to 1:9. In some embodiments, the weight ratio of 1-hexene to 1-octene in the oligomer composition is greater than 0.5:1. Varying the ratio of the 1-hexene catalyst to the 1-octene catalyst can influence the ratio of 1-hexene and 1-octene produced. By way of example, where the weight ratio of 1-hexene catalyst to 1-octene catalyst is about 1:1, the weight ratio of 1-hexene to 1-octene in the oligomer composition can be at least 2.5:1. In another example, when the weight ratio of 1-hexene catalyst to 1-octene catalyst is about 1:2.3, the weight ratio of 1-hexene to 1-octene in the oligomer composition can at least 1.5:1. In yet another example, the when the weight ratio of 1-hexene catalyst to 1-octene catalyst is about 1:4, the weight ratio of 1-hexene to 1-octene in the oligomer composition can be 1:1 or greater, preferably 1:1 to 1:1.2. In still another example, when the weight ratio of 1-hexene catalyst to 1-octene catalyst is about 1:8, the weight ratio of 1-hexene to 1-octene in the oligomer composition can be greater than 1:1.3, preferably, 1:1.3 to 1:1.5.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment or aspect discussed herein can be implemented with respect to any method or composition of the invention, and vice versa. Furthermore, compositions of the invention can be used to achieve methods of the invention.

The following includes definitions of various terms and phrases used throughout this specification.

The term "alkyl group" refers to a linear or a branched saturated hydrocarbon. Non-limiting examples of alkyl groups include methyl, ethyl, propyl, butyl, pentyl, etc.

An "aryl" group or an "aromatic" group is a substituted or substituted, mono- or polycyclic hydrocarbon with alternating single and double bonds within each ring structure. Non-limiting examples of aryl group substituents include alkyl, substituted alkyl groups, linear or branched alkyl groups, linear or branched unsaturated hydrocarbons, halogen, hydroxyl, alkoxy, haloalkyl, haloalkoxy, carboxylic acid, ester, amine, nitro, amide, nitrile, acyl, alkyl silane, thiol and thioether substituents. Non-limiting examples of alkyl groups include linear and branched $C_1$ to $C_5$ hydrocarbons. Non-limiting examples of unsaturated hydrocarbons include $C_2$ to $C_5$ hydrocarbons containing at least one double bond (e.g., vinyl). The aryl or alkyl group can be substituted with the halogen, hydroxyl, alkoxy, haloalkyl, haloalkoxy, carboxylic acid, ester, ether, amine, nitro ($-NO_2$), amide, nitrile ($-CN$), acyl, alkyl silane, thiol and thioether substituents. Non-limiting examples of halogens include chloro ($-Cl$), bromo ($-Br$), or fluoro ($-F$) substituents. Non-limiting examples of haloalkyl substituents include $-CX_3$, $-CH_2X$, $-CH_2CH_2X$, $-CHXCH_2X$, $-CX_2CHX_2$, $-CX_2CX_2$ where X is F, Cl, Br or combinations thereof. Non-limiting examples, of amine substituents include $-NH_2$, $-CH_2NH_2$, $-CHCH_2NH_2$, $-C(NH_2)CH_3$. Non-limiting examples of alkoxy include $-OCH_3$, $-OCH_2CH_3$, and the like. Non-limiting examples, of alkyl silane substituents include $-Si(CH_3)_3$, $-Si(CH_2CH_3)_3$, and the like. Non-limiting examples of polycyclic groups include ring systems that include 2 or more conjugated rings (e.g., fused aromatic rings) and substituted conjugated rings such as $-C_{10}H_7$ and substituted ten carbon conjugated ring systems.

The phrase "solvent insoluble" refers to hydrocarbon material with the molecular weight of 400 g/mol and above (30+ carbon atoms) that does not form a homogeneous solution with the reaction solvent under reaction conditions. For example, the material precipitates or forms a second phase during the reaction. Such material is present in amounts of less than <2 wt. %, preferably <1 wt. %, more preferably <0.5 wt. % as determined gravimetrically.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %", "vol. %", or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The processes of the present invention can "comprise," "consist essentially of," or "consist of" particular ingredients, components, compositions, etc. disclosed throughout the specification. With respect to the transitional phrase "consisting essentially of," in one non-limiting aspect, a basic and novel characteristic of the catalyst compositions of the present invention are their abilities to produce a composition that includes tunable amounts of high purity 1-octene and high purity 1-hexene through the oligomerization of ethylene with the production of minimal amounts of solvent insoluble material (e.g., <2 wt. %).

In the context of the present invention at least 20 embodiments are now described. Embodiment 1 is a catalyst composition for the production of 1-hexene and 1-octene. The catalyst composition comprising a 1-hexene catalyst and a 1-octene catalyst, wherein the 1-hexene catalyst, the 1-octene catalyst, or both include a nitrogen, phosphorous, nitrogen, phosphorous, nitrogen (NPNPN) ligand. Embodiment 2 is the catalyst composition of embodiment 1, wherein catalyst composition further includes a chromium (III) species, preferably chromium (III) acetylacetonate, Cr(2,2,6,6,-tetramethyl-3,5-heptadionate)$_3$, chromium(III)2-ethylhexanoate, chromium trichloride tris-tetrahydrofuran; (benzene)tricarbonyl chromium; chromium (III) octanoate; chromium hexacarbonyl; or chromium (III) naphthenate; and an activator or co-catalyst, preferably, methylaluminoxane compound, more preferably methyl iso-butyl aluminum oxide compound. Embodiment the catalyst composition of any one of embodiments 1 to 2, wherein the 1-octene catalyst includes a ligand having a structure of:

where $Ar^1$ and $Ar^2$ are each independently an aromatic group or a substituted aromatic group, n is 0 or 1 and m=n+3. Embodiment 4 is the catalyst composition of embodiment 3, wherein the $Ar^1$ and $Ar^2$ are each independently a phenyl group or an alkyl substituted phenyl group, preferably $Ar^1$ and $Ar^2$ are both phenyl groups. Embodiment 5 is the catalyst composition of embodiment 4, wherein n is 0, and the ligand has the structure of:

Embodiment 6 is the catalyst composition of embodiment 5, wherein n is 1 and the ligand has the structure of:

Embodiment 7 is the catalyst composition of embodiment 1, wherein the 1-hexene catalyst includes a ligand having a structure of:

where $R^1$ and $R^2$ are the same or different and are selected from the group consisting of (i) $C_3$ to $C_4$ non-cyclic aliphatic groups, (ii) $C_5$ to $C_{10}$ aliphatic groups which may be cyclic or non-cyclic, linear or branched, substituted or unsubstituted, and (iii) any combination thereof, and wherein n is 0 or 1, and m=n+3. Embodiment 8 is the catalyst composition of embodiment 7, wherein $R^1$ and $R^2$ are each independently a cyclic hydrocarbon group, a substituted cyclic hydrocarbon group, a linear hydrocarbon group or a branched hydrocarbon group having 5 to 10 carbon atoms, preferably $R^1$ and $R^2$ are each a cyclohexyl group. Embodiment 9 is the catalyst composition of embodiment 8, wherein n is 0, and the 1-hexene ligand has the structure of:

Embodiment 10 is the catalyst composition of embodiment 9, wherein n is 1 and the 1-hexene ligand has a structure of:

Embodiment 11 is the catalyst composition of embodiment 1, wherein the 1-octene catalyst includes a ligand having the structure of:

and the 1-hexene catalyst includes ligand having the structure of:

Embodiment 12 is a process to produce a composition comprising 1-hexene and 1-octene from olefins, the process comprising contacting a reactant stream comprising ethylene with a solution comprising the catalyst composition of any one of embodiments 1 to 11 under conditions sufficient to oligomerize the ethylene and produce an oligomer composition comprising the 1-hexene and 1-octene. Embodiment 13 is the process of embodiment 12, wherein a weight ratio of the 1-hexene catalyst to 1-octene catalyst is from 10:1 to 1:10, preferably 2:1 to 1:10, more preferably 1:1 to 1:9. Embodiment 14 is the process of any one of embodiments 12 to 13, wherein the weight ratio of 1-hexene to 1-octene in the oligomer composition is greater than 0.5:1. Embodiment 15 is the process of any one of embodiments 12 to 13, wherein the weight ratio of 1-hexene catalyst to 1-octene catalyst is about 1:1, and the weight ratio of 1-hexene to 1-octene in the oligomer composition is at least 2.5:1 Embodiment 16 is the process of any one of embodiments 12 to 13, wherein the weight ratio of 1-hexene catalyst to 1-octene catalyst is about 1:2.3, and the weight ratio of 1-hexene to 1-octene in the oligomer composition is at least 1.5:1. Embodiment 17 is the process of any one of embodiments 12 to 13, wherein the weight ratio of 1-hexene catalyst to 1-octene catalyst is about 1:4, and the weight ratio of 1-hexene to 1-octene in the oligomer composition is 1:1 or greater, preferably 1:1 to 1:1.2; or the weight ratio of 1-hexene catalyst to 1-octene catalyst is about 1:8, and the weight ratio of 1-hexene to 1-octene in the oligomer composition is greater than 1:1.3, preferably, 1:1.3 to 1:1.5. Embodiment 18 is the process of any one of embodiments 12 to 17, wherein oligomer composition includes a solvent insoluble material of 10 wt. % or less. Embodiment 19 is the process of any one of embodiments 12 to 18, wherein the contacting conditions include a temperature of 15° C. to 100° C., preferably 40° C. to 70° C., a pressure of at least 2 MPa or 2 to 20 MPa, preferably 2 to 7 MPa, or both. Embodiment 20 is the process of any one of embodiments 12 to 19, wherein the solution includes a solvent, preferably, a saturated hydrocarbon, more preferably, n-hexane, methylcyclohexane, or a mixture thereof.

BRIEF DESCRIPTION OF THE DRAWINGS

Advantages of the present invention may become apparent to those skilled in the art with the benefit of the following detailed description and upon reference to the accompanying drawings.

While the invention is susceptible to various modifications and alternative forms, specific embodiments thereof are shown by way of example in the drawings. The drawings may not be to scale.

DETAILED DESCRIPTION OF THE INVENTION

A discovery has been made that provides a way to produce tunable amounts of 1-hexene and 1-octene in acceptable yields, in high selectivity, and without making significant amounts of solvent insoluble material from the oligomerization of ethylene. The discovery is premised on using a mixture of a 1-hexene catalyst and a 1-octene catalyst with both catalysts having a NPNPN ligand systems specific for production of 1-hexene or 1-octene. Notably, and as illustrated in a non-limiting manner in the examples, the amounts of 1-hexene and 1-octene can be tuned based on the amount of specific catalyst used. By way of example, 1 50 wt. % of each catalyst produces a mixture that includes 65 to 70 wt. % 1-hexene and 30 wt. % to 35 wt. % to 1-octene while a 90:10 weight ratio of 1-octene catalyst to 1-hexene catalyst produces a mixture that includes 40 to 45 wt. % 1-hexene and 55 to 60 wt. % of 1-octene. In all cases. Further, less than 2 wt. % polymeric material is produced. Notably, the process can use the same solvent, chromium source and optional co-activators. This combination of catalyst provides an elegant and simple tunable process for the production of 1-hexene and 1-octene in high purity These and other non-limiting aspects of the present invention are discussed in further detail in the following sections.

A. Catalyst Compositions

The catalyst compositions can include the ligands of the present invention, a chromium (III) species, and an activator or co-catalyst. The ligands of the present invention can be prepared as described throughout the specification and in the Examples. The catalyst composition can be provided as a solution in an aliphatic or aromatic hydrocarbon solvent. Aliphatic hydrocarbon solvents can include hexane, methylcyclohexane, cyclohexane, n-heptane, toluene, and the like.

The chromium species can be an organic salt, an inorganic salt, a coordination complex, or an organometallic complex of Cr(III). In an embodiment, the chromium species is an organometallic Cr(III) species. Non-limiting examples of the chromium species include Cr(III)acetylacetonate, Cr(III) octanoate, $CrCl_3(tetrahydrofuran)_3$, Cr(III)-2-ethylhexanoate, Cr(III)chloride, or any combination thereof. The molar ligand/Cr ratio for each catalyst can be from about 0.5 to 50, about 0.5 to 5, about 0.8 to about 2.0, about 1.0 to 5.0, or preferably from about 1.0 to about 1.5.

The activator (also known in the art as a co-catalyst) can be an aluminum compound. Non-limiting examples of aluminum compounds include trimethylaluminum, triethylaluminum, triisopropylaluminum, triisobutylaluminum, diethylaluminum chloride, ethylaluminum sesquichloride, ethylaluminum dichloride, methylaluminoxane, or a mixture thereof. In some embodiments, the activator can be a modified methylaluminoxane, more preferably MMAO-3A (CAS No. 146905-79-5), which is a modified methylaluminoxane, type 3A, available from Akzo Nobel in toluene solution containing 7% aluminum, which corresponds to an MMAO-3A concentration of about 18%. The molar Al/Cr ratio can be from about 1 to about 1000, about 10 to about 1000, about 1 to 500, about 10 to about 500, about 10 to about 300, about 20 to about 300, or preferably from 50 to about 300.

The catalyst composition can further include a solvent. The solvent can be the same or different than the solvent used in the oligomerization process with the proviso that the solvents are miscible. Non-limiting examples of solvents are straight-chain and cyclic aliphatic hydrocarbons, straight-chain olefins, ethers, aromatic hydrocarbons, and the like. A combination comprising at least one of the foregoing solvents can be used. Preferably, the solvent is n-heptane, toluene, or methylcyclohexane or any mixture thereof.

The concentration of the chromium compound in the catalyst solvent vary depending on the particular compound used and the desired reaction rate. In some embodiments, the concentration of the chromium compound is from about 0.01 to about 100 millimole per liter (mmol/L), about 0.01 to about 10 mmol/L, about 0.01 to about 1 mmol/L, about 0.1 to about 100 mmol/L, about 0.1 to about 10 mmol/L, about 0.1 to about 1 0 mmol/L, about 1 to about 10 mmol/L, and about 1 to about 100 mmol/L. Preferably, the concentration of the chromium compound is from about 0.1 to about 1.0 mmol/L.

1. 1-Hexene Catalyst Ligands

The ligands of the 1-hexene catalyst of the present invention can be represented by the following formula:

where $R^1$ and $R^2$ selected from the group consisting of (i) $C_3$ to $C_4$ non-cyclic aliphatic groups, (ii) $C_5$ to $C_{10}$ aliphatic groups which may be each be cyclic or non-cyclic, linear or branched, substituted or unsubstituted, and (iii) any combination thereof, and wherein n is 0 or 1, and m=n+3. The $C_5$ to $C_{10}$ aliphatic groups can include cyclic or non-cyclic, linear or branched, substituted or unsubstituted. Non-limiting examples of $C_5$ to $C_{10}$ aliphatic groups include pentyl, cyclopentyl, hexyl, cyclohexyl, heptyl, cycloheptyl, octyl, cyclooctyl, nonyl, cyclononyl, decyl, cyclodecyl, which can include substituents that make the compounds substituted or branched. In a preferred instance, $R^1$ and $R^2$ are cyclohexyl. The $C_3$ to $C_4$ non-cyclic aliphatic groups can be iso-propyl and tert-butyl. The ligands can be $(CH_3)(n-C_4H_9)NP(R^1)N$ $(CH_3)NP(R^2)N(CH_3)(n-C_4H_9)$ and $(CH_3CH_2)(n-C_5H_{11})NP$ $(R^1)N(CH_3)NP(R^2)N(CH_2CH_3)(n-C_5H_{11})$ $(CH_3)(n-C_4H_9)$ $NP(C_6H_{11})N(CH_3)NP(C_6H_{11})N(CH_3)(n-C_4H_9)$ and $(CH_3CH_2)(n-C_5H_{11})NP(C_6H_{11})N(CH_3)NP(C_6H_{11})N$ $(CH_2CH_3)(n-C_5H_{11})$. Non-limiting structures of the ligands are as follows:

(5)

where $R^3$ and $R^4$ represent alkyl groups on any carbon atom. Non-limiting examples of $R^3$ and $R^4$ include methyl, ethyl, propyl, isopropyl, butyl, tert-butyl, and pentyl, and the like.

The NPNPN ligand system can be made by synthetic approaches known to those skilled in the art. In some embodiments, ligand (1) is accessible by reaction pathways as shown in Scheme I.

(I)

where $R^1$ and $R^2$ are defined above, and $R^5$ is methyl or ethyl, and $R^6$ is butyl when $R^5$ is methyl and $R^6$ is pentyl when $R^5$ is ethyl.

In some embodiments, the catalyst composition includes Cr(III)acetylacetonate as the chromium compound, Et(n-pentyl)N—P(cyclohexyl)-N(Me)-P(cyclohexyl)-N(n-pentyl)Et as the NPNPN ligand, and MMAO-3A as the activator. In another embodiment, the catalyst composition includes Cr(III)acetylacetonate as the chromium compound, Me(n-butyl)N—P(cyclohexyl)-N(Me)-P(cyclohexyl)-N(n-butyl)Me as the NPNPN ligand, and MMAO-3A as the activator.

2. 1-Octene Catalyst Ligands

The critical parameters of the 1-octene catalyst include the choice of phosphorous substituents and nitrogen substituents. The phosphorous substituents include an aromatic group or an alkyl substituted aromatic group, the middle nitrogen substituent includes a methyl substituent, and the terminal nitrogen substituents include different linear alkyl hydrocarbons groups that differ in the number of carbon atoms by 3. The ligands of the 1-octene catalyst present invention can be represented by the following formula:

(6)

where $Ar^1$ and $Ar^2$ can each be independently an aromatic group or a substituted aromatic group, n is 0 or 1 and m=n+3. Aromatic groups or substituted aromatic groups include phenyl (Ph), $C_6$-$C_{11}$ aryl or $C_6$-$C_{20}$ substituted aryl. Non-limiting examples of $C_6$-$C_{11}$ aryl groups include methylbenzyl, dimethylbenzyl (ortho, meta, and para substituted), ethylbenzyl, propylbenzyl, and the like. Non-limiting examples of substituents for substituted $C_6$-$C_{20}$ aryl groups include alkyl, substituted alkyl groups, linear or branched alkyl groups, linear or branched unsaturated hydrocarbons, halogen, hydroxyl, alkoxy, haloalkyl, haloalkoxy, carboxylic acid, ester, amine, nitro, amide, nitrile, acyl, alkyl silane, thiol and thioether substituents. Non-limiting examples of alkyl groups include linear and branched $C_1$ to $C_5$ hydrocarbons. Non-limiting examples of unsaturated hydrocarbons include $C_2$ to $C_5$ hydrocarbons containing at least one double bond (e.g., vinyl). The aryl or alkyl group can be substituted with the halogen, hydroxyl, alkoxy, haloalkyl, haloalkoxy, carboxylic acid, ester, ether, amine, nitro (—$NO_2$), amide, nitrile (—CN), acyl, alkyl silane, thiol and thioether substituents. Non-limiting examples of halogens include chloro (—Cl), bromo (—Br), or fluoro (—F) substituents. Non-limiting examples of haloalkyl substituents include —$CX_3$, —$CH_2X$, —$CH_2CH_2X$, —$CHXCH_2X$, —$CX_2CHX_2$, —$CX_2CX_2$ where X is F, Cl, Br or combinations thereof. Non-limiting examples, of amine substituents include —$NH_2$, —$CH_2NH_2$, —$CHCH_2NH_2$, —$C(NH_2)CH_3$. Non-limiting examples of alkoxy include —$OCH_3$, —$OCH_2CH_3$, and the like. Non-limiting examples, of alkyl silane substituents include —$Si(CH_3)_3$, —$Si(CH_2CH_3)_3$, and the like. Non-limiting examples of polycyclic groups include fused aromatic rings and substituted fused aromatic rings such as —$C_{10}H_7$ and substituted ten carbon fused aromatic ring systems. In some embodiments, the $C_6$-$C_{20}$ aryl groups are chlorobenzene, bromobenzene, trifluorotoluene, phenylamine, nitrobenzene, dichlorotoluene, benzonitrile, trimethylbenzylsilane, benzylmethyl ether, or a fused aromatic ring ($C_{10}H_7$). The ligands can be $(CH_3)(n$-$C_4H_9)$NP($Ar^1$)N($CH_3$)NP($Ar^2$)N($CH_3$)(n-$C_4H_9$) and $(CH_3CH_2)(n$-$C_5H_{11})$NP($Ar^1$)N($CH_3$)NP($Ar^2$)N($CH_2CH_3$)(n-$C_5H_{11}$) $(CH_3)(n$-$C_4H_9)$NP($C_6H_5$)N($CH_3$)NP($C_6H_5$)N($CH_3$)(n-$C_4H_9$) and $(CH_3CH_2)(n$-$C_5H_{11})$NP($C_6H_5$)N($CH_3$)NP($C_6H_5$)N($CH_2CH_3$)(n-$C_5H_{11}$). The structure of the ligands can be illustrated as follows:

(7)

-continued

(8)

(9)

(10)

where $R^7$ and $R^8$ represent alkyl groups substituted on the aromatic ring. Non-limiting examples of such alkyl groups include methyl, ethyl, propyl, isopropyl, butyl, tert-butyl, and pentyl, and the like.

The NPNPN ligand system can be made by synthetic approaches known to those skilled in the art. In some embodiments, ligand (1) is accessible by reaction pathways as shown in Scheme I (II)

where $Ar^1$ and $Ar^2$ are defined above, and $R^5$ is methyl or ethyl, and $R^6$ is butyl when $R^5$ is methyl and pentyl when $R^6$ is ethyl.

Non-limiting examples of a 1-hexene catalyst system in the mixture includes Cr(III)acetylacetonate as the chromium compound, Et(n-pentyl)N—P(Ph)-N(Me)-P(Ph)-N(n-pentyl)Et as the NPNPN ligand, and MMAO-3A as the activator. In another embodiment, the catalyst system includes Cr(III)acetylacetonate as the chromium compound, Me(n-butyl)N—P(Ph)-N(Me)-P(Ph)-N(n-butyl)Me as the NPNPN ligand, and MMAO-3A as the activator.

B. System for Oligomerization of Ethylene to 1-Hexane and 1-Octene

The mixture of the above-described catalyst compositions of the present invention can be used in a process for the tunable oligomerization of ethylene to produce a composition that includes a desired ratio of 1-hexene and 1-octene. In an embodiment, the process encompasses contacting ethylene with the catalyst composition under ethylene oligomerization conditions effective to produce mixtures of 1-hexene and 1-octene. Those skilled in the art will understand that oligomerization of ethylene to produce 1-hexene and 1-octene can be by trimerization and tetramerization of ethylene, respectively. The weight ratio of 1-hexene catalyst to 1-octene catalyst can be 10:1 to 1:10, or 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10. The weight ratio of 1-hexene to 1-octene in the composition can be greater than 0.5:1, or 0.5:1, 1.0:1, 1.5:1, 2:1, 2.5:1, 3:1, 3.5:1, 4:1, or 5:1 when the weight ratio of 1-hexene catalyst to 1-octene catalyst is from 1:1 to 10:1. The weight ratio of 1-hexene to 1-octene in the composition can be greater than 0.5:1, or 0.5:1, 1:1, 1:1.5, 1:2, 1:2.5, 1:1, 1:3.5, 1:4, or 1:5 when the weight ratio of 1-hexene catalyst to 1-octene catalyst is from 1:1 to 1:10.

The oligomerization solvent can include any solvent the catalyst system is soluble in. By way of example a saturated hydrocarbon, more preferably, n-hexane, n-heptane, methylcyclohexane, or a mixture thereof can be used. Reaction conditions can be include temperature and pressure. The reaction temperature can be 15° C. to 100° C., or at least any one of, equal to any one of, or between any two of 15° C., 20° C., 25° C., 30° C., 35° C., 40° C., 45° C., 50° C., 55° C., 60° C., 65° C., 70° C., 75° C., 80° C., 85° C., 90° C., 95° C. and 100° C. In some instances, the reaction temperature can range from 40° C. to 70° C. Reaction pressures can include at least any one of, equal to any one of, or between any two of 2 MPa, 3, 4, 5, 6, 7, 8, 9, 10, 11, 12, 13, 14, 15, 16, 17, 18, 19 and 20 MPa. In some embodiments, the reaction pressure is 2 to 20 MPa. By way of example, a reaction temperature can be 40° C. to 70° C. at a pressure of 2 to 7 MPa.

Figure 1:
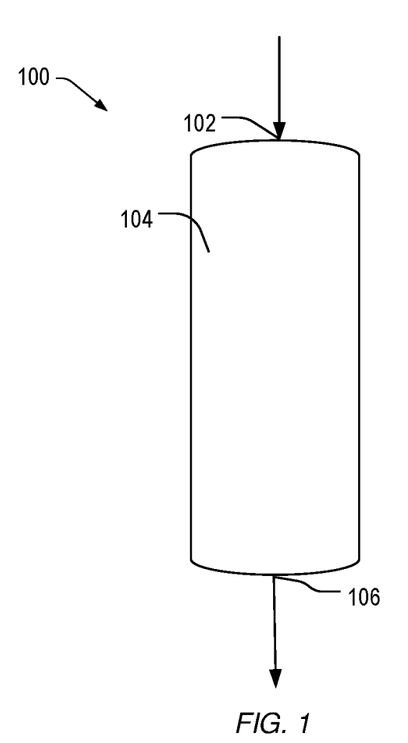
FIG. 1 is an illustration of a schematic of a system to produce a composition that include 1-hexene and 1-octene from the oligomerization of ethylene.

FIG. 1 depicts a schematic for a system to produce a tunable mixture of 1-hexene and 1-octene. System 100 can include inlet 102 for a reactant feed that includes ethylene, reaction zone 104 that is configured to be in fluid communication with the inlet, and outlet 106 configured to be in fluid communication with reaction zone 104 and configured to remove a product stream that includes a mixture of 1-hexene and 1-octene from the reaction zone. Reactant zone 104 can include the catalyst mixture of the present invention. The ethylene reactant feed can enter reaction zone 104 via the inlet 102. In some embodiments, the ethylene reactant feed can be used to maintain a pressure in reaction zone 104. In some embodiments, the reactant feed stream includes inert gas (e.g., nitrogen or argon). After a sufficient amount of time, the product stream having the desired amount of 1-hexene and 1-octene can be removed from the reaction zone 104 via product outlet 106. The product stream can be sent to other processing units, stored, and/or transported. In some embodiments, product stream 106 is sent to a separation unit, which separates the mixture into streams of 1-hexene and 1-octene.

System 100 can include one or more heating and/or cooling devices (e.g., insulation, electrical heaters, jacketed heat exchangers in the wall) or controllers (e.g., computers, flow valves, automated values, etc.) that can be used control the reaction temperature and pressure of the reaction mixture. While only one reactor is shown, it should be understood that multiple reactors can be housed in one unit or a plurality of reactors housed in one heat transfer unit.

As discussed above, the process and catalyst composition of the present invention allows for the production of 1-octene and 1-hexene with high selectivity with the LAO product distribution being limited to 1-hexene and 1-octene. Tunable selectivity for 1-octene and 1-hexene is an advantageous feature inasmuch as it leads to higher product purity, thereby circumventing the need for additional purification steps in the separation train. Further advantageous features of the catalyst selection and process include suppression of ethylene polymerization leading to undesirable polymer formation, milder reaction conditions and, as a result, lower capital costs for equipment as well as operational and energy costs. Additionally, a relatively simple, straight-forward process design is possible. The purity for 1-octene can be at least about 99%, or 99.1%, 99.2%, 99.3%, 99.4%, 99.5%, 99.6%, 99.7%, 99.8%, or 99.9%. A purity of at least 99.1% is preferred. The purity for 1-hexene can be at least about 99%, or 99.1%, 99.2%, 99.3%, 99.4%, 99.5%, 99.6%, 99.7%, 99.8%, or 99.9%. A purity of at least 99.1% is preferred. In an embodiment, when 1-octene is produced, the weight ratio of 1-octene to 1-hexene can be less than 03, or 0 to 0.3, or 0.1, 0.15, 0.2, 0.25 or 0.3 or any range or value there between.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Synthesis of Ligand 2

Route A, General Procedure (See, Scheme I). All manipulations were carried out under inert atmosphere. Bis(chlorophosphino)amine $C_6H_{11}P(Cl)N(CH_3)P(Cl)C_6H_{11}$ (4.60 g, 14 mmol) was dissolved in 20 mL of anhydrous toluene. Appropriate secondary amine (29.4 mmol of butylamine) and $NEt_3$ (35 mmol) was mixed with 30 mL of anhydrous toluene and cooled down to −10° C. Toluene solution of bis(chlorophosphino)amine was added dropwise to the reaction mixture under inert atmosphere with vigorous stirring. Addition of the reagent resulted in precipitation of white gel-like material. With continuous stirring, solution was left to warm up to 25° C. for 3 hours, then heated to 75° C. and stirred at that temperature for additional 12 hrs. After evaporation of all volatile compounds under vacuum, the residue was taken up in anhydrous hot n-heptane and insoluble material was separated by filtration. Evaporation of the solvent led to pale yellow oil. Purity of the product was verified using $^1H$, $^{13}C$ and $^{31}P$ NMR. If desired, the products can be recrystallized from n-hexane, cyclohexane, n-heptane or n-pentane to increase the purity.

Route B, General Procedure (See, Scheme I). All manipulations were carried out under inert atmosphere. The appropriate secondary amine (10 mmol) was dissolved in 20 mL of anhydrous n-heptane, cooled down to −10° C. and treated with 5% mol. excess of n-BuLi in n-hexane. The solution was then stirred for 3 hrs letting the temperature raise to 25° C., forming white precipitate. Solid was separated from solution, washed with n-hexane and transferred to the flask with 30 mL of anhydrous $Et_2O$. Resulted suspension was cooled down to −10° C. and solution of bis(chlorophosphino) amine $C_6H_{11}P(Cl)N(CH_3)P(Cl)C_6H_{11}$ (1.61 g, 4.9 mmol) in 30 mL of anhydrous $Et_2O$ was added dropwise to the reaction mixture with vigorous stirring. After the addition, reaction mixture was continuously stirred for 12 hours letting it warm up to 25° C. During the course of the reaction, white solid was formed. Insoluble material was separated by filtration, washed with $Et_2O$ and discarded. Solution and washing liquids were combined and solvent was removed in vacuum, producing pale yellow viscous oil. Purity of the product was verified using $^1H$, $^{13}C$ and $^{31}P$ NMR. If desired, the products can be recrystallized from n-hexane, cyclohexane, n-heptane or n-pentane to increase the purity.

Precursor $(C_6H_{11})P(Cl)N(Me)P(Cl)(C_6H_{11})$ was prepared using the procedure of Jefferson et al. (*J. Chem. Soc. Dalton Trans.* 1973, 1414-1419).

Example 1

Synthesis of Ligand 7

Two methodologies can be used to prepare ligands have structures (2) and (3) above. The comparative ligand had the structure below where the amino functionality included a methyl group and ethyl group (i.e., n is less than 3).

Route A, General Procedure (See, Scheme 1). All manipulations were carried out under inert atmosphere. Bis(chlorophosphino)amine $(PhP(Cl)N(CH_3)P(Cl)Ph$, 4.42 g, 14 mmol) was dissolved in 20 mL of anhydrous toluene. An appropriate secondary amine (29.4 mmol) and $NEt_3$ (35 mmol) was mixed with 30 mL of anhydrous toluene and cooled down to −10° C. Toluene solution of bis(chlorophosphino)amine was added dropwise to the reaction mixture under inert atmosphere with vigorous stirring. Addition of the reagent resulted in precipitation of white gel-like material. With continuous stirring, solution was left to warm up to 25° C. for 3 hours, then heated to 75° C. and stirred at that temperature for additional 12 hrs. After evaporation of all volatile compounds under vacuum, the residue was taken up in anhydrous hot n-heptane and insoluble material was separated by filtration. Evaporation of the solvent led to a white oil. Purity of the product was verified using $^1H$, $^{13}C$ and $^{31}P$ NMR. If desired, the products can be recrystallized from n-hexane, cyclohexane, n-heptane or n-pentane to increase the purity.

Route B, General Procedure (See, Scheme 1). All manipulations were carried out under inert atmosphere. The appropriate secondary amine (10 mmol) was dissolved in 20 mL of anhydrous n-heptane, cooled down to −10° C. and treated with 5% molar excess of n-BuLi in n-hexane. The solution was then stirred for 3 hrs letting the temperature raise to 25° C., forming a white precipitate. The solid was separated from solution, washed with n-hexane and transferred to the flask with 30 mL of anhydrous ether. The resulted suspension was cooled down to −10° C. and solution of bis(chlorophosphino) amine (PhP(Cl)N(CH$_3$)P(Cl)Ph, 1.55 g, 4.9 mmol) in 30 mL of anhydrous ether was added dropwise to the reaction mixture with vigorous stirring. After the addition reaction mixture was continuously stirred for 12 hours letting it warm up to 25° C. During the course of the reaction, a white solid was formed. The insoluble material was separated by filtration, washed with ether and discarded. Solution and washing liquids were combined, and the solvent was removed in vacuum, producing a white viscous oil. Purity of the product was verified using $^1$H, $^{13}$C and $^{31}$P NMR. If desired, the products can be recrystallized from n-hexane, cyclohexane, n-heptane or n-pentane to increase the purity.

Precursor PhP(Cl)N(Me)P(Cl)Ph was prepared using the procedure of Jefferson et al. (*J. Chem. Soc. Dalton Trans.* 1973, 1414-1419).

Example 2

Catalyst Composition Preparation and Oligomerization of Ethylene

The reactor, equipped with dip tube, thermowell, mechanical paddle stirrer, cooling coil, control units for temperature, pressure and stirrer speed (all hooked up to a data acquisition system) was then inertized heating to 130° C. in under vacuum and cooled down by venting with dry nitrogen stream to 30° C. An isobaric ethylene supply was maintained by gas dosing control unit connected to data acquisition system. Ethylene consumption was monitored via pressure loss in the feeding cylinder over time by means of a computerized data acquisition system.

Suitable amounts of the stock toluene solutions of the ligands (ligand (2) of the present invention or the comparative ligand) and Cr(III)acetylacetonate as chromium precursor, at a ligand to Cr ratio of 1.20, were measured and charged to a Schlenk tube under inert atmosphere. A volume of 30 mL anhydrous n-heptane was added introduced in stainless steel pressure reactor and warmed up to the reaction temperature. After temperature of the reactor become stable, reactor was pressurized to 30 bar with ethylene and left for 0.5 hour with continuous mechanical stirring. After that time, pressure was reduced to 0.2 bar (0.02 MPa) and appropriate amount of 0.3 M stock solution of MMAO-3A in anhydrous n-heptane was introduced in the reactor through the charging port, providing Al to Cr ratio of 300. Stirring was continued for 10 min. Following that, mixture of Cr and ligand solutions was introduced into the reactor through the charging port.

Immediately after introduction of the catalyst in the reactor, pressure was increased to 30 bar (3 MPa). Standard reaction conditions are: pressure of ethylene of 30 bar (3 MPa), T of 45° C., stirrer speed of 450 RPM. After 1 hour catalytic run, ethylene supply was cut and reactor temperature lowered to 5° C. Ethylene from the reactor was vented to the pressure of 0.2 bar (0.02 MPa). The reaction was stopped by quenching with 0.3 M HCl/iso-propanol mixture. Liquid products were analyzed using gas chromatography with a known amount of toluene internal standard. Any insoluble by-products, i.e., waxes, polyethylene, were filtered, dried, and weighed. A consecutive catalyst experiment was performed without cleaning the reactor was performed using the same ingredients and amounts described above. Table 1 shows the results of ligand having structures 2 and 7 and the mixtures thereof.

TABLE 1

| Catalyst | Activity (kg/g$_{Cr}$ * h) | % wt. C6 (1-hexene, %) | % wt. C8 (1-octene, %) | Solvent Insolubles % wt. |
|---|---|---|---|---|
| 1-Hexene Catalyst | 99.0 | 24.1(77.67) | 72.6(99.52) | 1.46 |
| 1-Octene Catalyst | 170.5 | 87.2(99.92) | 5.7(99.99) | 0.89 |
| TANDEM 1-Octene catalyst 50% wt. 1-Hexene catalyst 50% wt. | 93.5 | 68.6(96.98) | 26.56(99.51) | 0.96 |
| TANDEM 1-Octene catalyst 70% wt. 1-Hexene catalyst 30% wt. | 97.9 | 61.2(95.60) | 35.3(99.57) | 0.90 |
| TANDEM 1-Octene catalyst 80% wt. 1-Hexene catalyst 20% wt. | 46.9 | 47.7(91.85) | 49.3(99.81) | 1.53 |
| TANDEM 1-Octene catalyst 90% wt. 1-Hexene catalyst 10% wt. | 46.4 | 41.2(87.6) | 56.8(99.53) | 1.43 |

Figure 2:
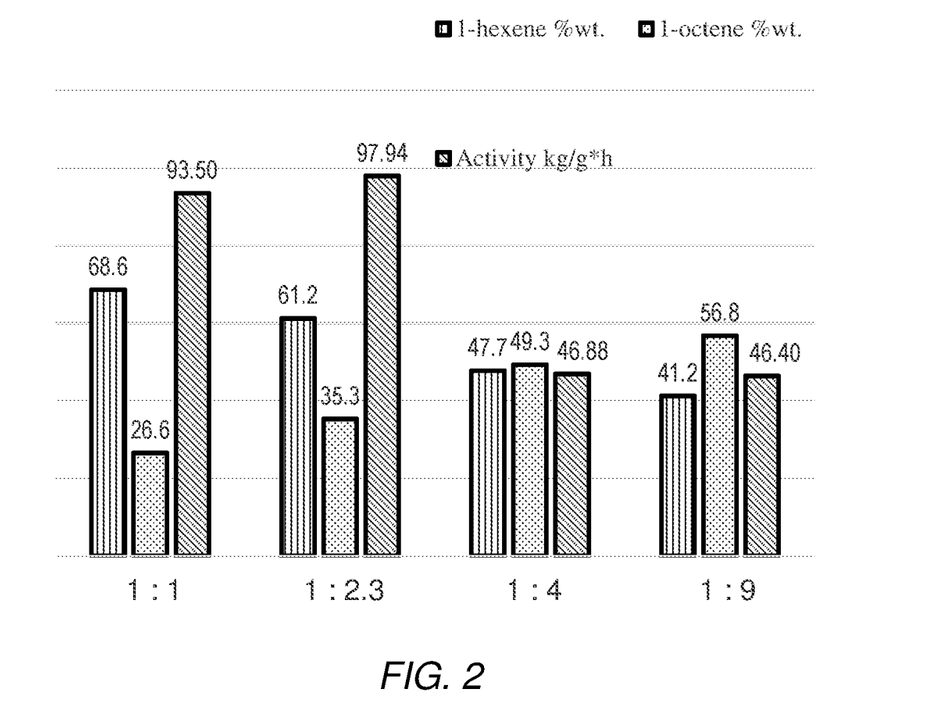
FIG. 2 is graphical illustration of the activity and product distribution from composition that includes various ratios of the 1-hexene and 1-octene catalysts.

Table 1 summarizes the results of ethylene oligomerization experimental runs performed under these standard conditions and using catalyst systems prepared with the mixtures of 1-hexene and 1-octene catalyst and the individual catalysts. The Table shows the respective selectivities for hexene (C6), octene (C8), and solvent insolubles in wt. % in the liquid phase. Numbers in parentheses denote the selectivities of the respective linear alpha-olefin in the overall C6/C8 fraction. These LAO purities were generally advantageously high. FIG. 2 is a graphical representation of the Table 1 results for the catalyst mixtures. As can be seen from the results, mixing of the catalysts led to selectivity in the final mixture composition without detrimental effects on purity of terminal alkenes and catalytic activity.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A catalyst composition for the production of 1-hexene and 1-octene, the catalyst composition comprising a 1-hexene catalyst and a 1-octene catalyst, wherein the 1-hexene catalyst and the 1-octene catalyst comprise a nitrogen, phosphorous, nitrogen, phosphorous, nitrogen (NPNPN) ligand, and wherein the 1-hexene catalyst comprises a ligand having a structure of:

where $R^1$ and $R^2$ are the same or different and are selected from the group consisting of (i) $C_3$ to $C_4$ non-cyclic aliphatic groups, (ii) $C_5$ to $C_{10}$ aliphatic groups which may be cyclic or non-cyclic, linear or branched, substituted or unsubstituted, and (iii) any combination thereof, and wherein n is 0 or 1, and m=n+3.

2. The catalyst composition of claim 1, wherein catalyst composition further comprises:
   a chromium (III) species; and
   an activator or co-catalyst.

3. The catalyst composition of claim 1, wherein the 1-octene catalyst comprises a ligand having a structure of:

where $Ar^1$ and $Ar^2$ are each independently an aromatic group or a substituted aromatic group, n is 0 or 1 and m=n+3.

4. The catalyst composition of claim 3, wherein the $Ar^1$ and $Ar^2$ are each independently a phenyl group or an alkyl substituted phenyl group.

5. The catalyst composition of claim 4, wherein the ligand of the 1-octene catalyst has the structure of:

6. The catalyst composition of claim 4, wherein the ligand of the 1-octene catalyst has the structure of:

7. The catalyst composition of claim 1, wherein $R^1$ and $R^2$ are each independently a $C_5$ to $C_{10}$ cyclic hydrocarbon group or a substituted $C_5$ to $C_{10}$ cyclic hydrocarbon group.

8. The catalyst composition of claim 7, wherein the 1-hexene ligand has the structure of:

9. The catalyst composition of claim 7, wherein the 1-hexene ligand has a structure of:

10. The catalyst composition of claim 1, wherein the 1-octene catalyst comprises a ligand having the structure of:

and the 1-hexene catalyst comprises ligand having the structure of:

11. A process to produce a composition comprising 1-hexene and 1-octene from olefins, the process comprising contacting a reactant stream comprising ethylene with a solution comprising the catalyst composition of claim 1 under conditions sufficient to oligomerize the ethylene and produce an oligomer composition comprising the 1-hexene and 1-octene.

12. The process of claim 11, wherein a weight ratio of the 1-hexene catalyst to 1-octene catalyst is from 10:1 to 1:10.

13. The process of claim 11, wherein the weight ratio of 1-hexene to 1-octene in the oligomer composition is greater than 0.5:1.

14. The process of claim 11, wherein the weight ratio of 1-hexene catalyst to 1-octene catalyst is about 1:1, and the weight ratio of 1-hexene to 1-octene in the oligomer composition is at least 2.5:1.

15. The process of claim 11, wherein the weight ratio of 1-hexene catalyst to 1-octene catalyst is about 1:2.3, and the weight ratio of 1-hexene to 1-octene in the oligomer composition is at least 1.5:1.17.

16. The process of claim 11, wherein the weight ratio of 1-hexene catalyst to 1-octene catalyst is about 1:4, and the weight ratio of 1-hexene to 1-octene in the oligomer composition is 1:1 or greater; or the weight ratio of 1-hexene catalyst to 1-octene catalyst is about 1:8, and the weight ratio of 1-hexene to 1-octene in the oligomer composition is greater than 1:1.3.

17. The catalyst composition of claim 2, wherein the chromium (III) species is selected from the group consisting of chromium (III) acetylacetonate, Cr(2,2,6,6,-tetramethyl-3,5-heptadionate)$_3$, chromium (III) 2-ethylhexanoate, chromium trichloride tris-tetrahydrofuran, (benzene) tricarbonyl chromium, chromium (III) octanoate, chromium hexacarbonyl, and chromium (III) naphthenate.

18. The catalyst composition of claim 2, wherein the activator or co-catalyst is a methylaluminoxane compound.

19. The catalyst composition of claim 18, wherein the methylaluminoxane compound is a methyl iso-butyl aluminum oxide compound.

20. The catalyst composition of claim 4, wherein $Ar^1$ and $Ar^2$ are phenyl.

21. The catalyst composition of claim 7, wherein $R^1$ and $R^2$ are each a cyclohexyl group.

22. The catalyst composition of claim 1, wherein the weight ratio of 1-hexene catalyst to 1-octene catalyst is about 1:1 to about 1:9.

* * * * *

UNITED STATES PATENT AND TRADEMARK OFFICE
CERTIFICATE OF CORRECTION

PATENT NO. : 12,440,830 B2
APPLICATION NO. : 17/435831
DATED : October 14, 2025
INVENTOR(S) : Maher Al-Dajane et al.

Page 1 of 2

It is certified that error appears in the above-identified patent and that said Letters Patent is hereby corrected as shown below:

In the Claims

In Column 21, Lines 10-18, in Claim 1, delete "  " and insert --  --.

Signed and Sealed this
Thirteenth Day of January, 2026

John A. Squires
*Director of the United States Patent and Trademark Office*

CERTIFICATE OF CORRECTION (continued)
U.S. Pat. No. 12,440,830 B2

In Column 21, Lines 35-42, in Claim 3, delete "  "

and insert --  --.